United States Patent
Kosaraju

(10) Patent No.: US 8,139,074 B2
(45) Date of Patent: Mar. 20, 2012

(54) MEMORY OPTIMIZED CACHE GENERATION FOR IMAGE TILING IN GIS/CAD BROWSER APPLICATIONS

(75) Inventor: Ravi Krishna Kosaraju, Middle Island, NY (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 11/945,812

(22) Filed: Nov. 27, 2007

(65) Prior Publication Data

US 2009/0136142 A1 May 28, 2009

(51) Int. Cl.
*G06F 12/02* (2006.01)
*G06T 1/60* (2006.01)
*G09G 5/36* (2006.01)

(52) U.S. Cl. .................. 345/544; 345/530; 345/557

(58) Field of Classification Search .................. 345/530, 345/544, 557
See application file for complete search history.

(56) References Cited

U.S. PATENT DOCUMENTS

| | | | |
|---|---|---|---|
| 5,682,441 A | 10/1997 | Ligtenberg et al. | |
| 5,825,944 A * | 10/1998 | Wang | 382/309 |
| 6,466,223 B1 | 10/2002 | Dorbie et al. | |
| 6,873,329 B2 | 3/2005 | Cohen et al. | |
| 7,551,182 B2 * | 6/2009 | Bethune et al. | 345/619 |
| 2004/0233207 A1 | 11/2004 | Morphet | |
| 2006/0031537 A1 * | 2/2006 | Boutboul et al. | 709/228 |

* cited by examiner

*Primary Examiner* — Joni Hsu
(74) *Attorney, Agent, or Firm* — Yee & Associates, P.C.; Jeffrey S. LaBaw

(57) ABSTRACT

The illustrative embodiments described herein provide a computer implemented method, apparatus, and computer program product for generating tile sizes associated with an image presented by a web based image system. An optimal threshold memory size for tiles associated with the image is identified. The image is then divided into tiles of equal physical dimensions and placed into a set of subdivided tiles. The memory size of each tile within the set of subdivided tiles is compared to the threshold memory size. Tiles having a memory size less than or equal to the threshold memory size are deleted from the set of subdivided tiles and stored. Tiles having a memory size greater than the threshold memory size are subdivided into tiles of smaller physical dimensions. The smaller tiles are placed back in the set of subdivided tiles. The process repeats until no tiles exist within the set of subdivided tiles.

17 Claims, 4 Drawing Sheets

MEMORY OPTIMIZED CACHE GENERATION FOR IMAGE TILING IN GIS/CAD BROWSER APPLICATIONS

BACKGROUND OF THE INVENTION

1. Field of the Invention

The present invention relates generally to the data processing field and, more particularly, to a computer implemented method, system, and computer program product for optimizing cache generation for image tiling in GIS/CAD browser applications.

2. Description of the Related Art

A geographic information system (GIS) is a system for capturing, storing, analyzing, and managing data and associated attributes which are spatially referenced to the Earth. In a more generic sense, a geographic information system is a tool that accepts interactive searches, analyzes the spatial information, edits data, maps, and presents the results of all these operations to a user. Geographic information system technology can be used for scientific investigations, resource management, asset management, environmental impact assessment, urban planning, cartography, marketing, and logistics.

A geographic information system may also be web based, meaning that a user can access the geographic information system over the internet through the use of an internet browser. An example of a web based geographic information system is Google Map™. Google Map™ is a trademark of Google Inc.

One of the common techniques used by web based geographic information systems is to pre-generate two dimensional raster images from vector data prior to serving an image to a client. Because the size associated with an image is significantly large, an image is broken into smaller sections prior to serving the image. The smaller sections are also referred to as tiles. When a client requests an area of the image/map, the required tiles are calculated by the server and returned to the client. Additionally, clients may request a larger area as compared to the area currently being displayed on the internet browser. The larger area may be requested to achieve a seamless panning experience to the user.

Currently, due to memory limitations on the client side and the desire to optimize download time, an optimal physical dimension for an image is estimated before receiving a client request. Tiles of equal physical dimensions are generated using the estimated optimal physical dimension. The tiles are then stored on a server associated with the web based geographic information system. When a client requests an image, the tiles are downloaded and assembled on the client system to form the image.

The term optimal, as reference herein, is a condition in which the cache provides a maximum area of an image while maintaining a seamless panning experience to the user. A seamless panning experience is conditioned on the download rate and the screen refresh rate associated with an image.

Computer aided design (CAD) systems are tools used to design, develop and optimize products. Computer aided design systems may also be web based. Although, web based computer aided design systems are less popular than web based geographic information systems due to the significant amount of data involved, computer aided design systems also divide images into fixed tile sizes based on the physical dimensions of the image.

However, fixed tile sizes based on the physical dimension of the image do not provide optimal performance in terms of both download rate and screen refresh rate. Fixed tile sizes (by physical dimensions) vary greatly in memory size making some tiles large and some tiles small in memory. Tile sizes that are too small in memory require a higher rate of screen updates and more requests to the server. Therefore, more overhead is associated with each request. Tile sizes that are too large in memory require longer download times and a slower rate of screen updates resulting in a noticeable lag in updating the tiles.

Accordingly, it would be advantageous to have a computer implemented method, apparatus, and computer program product for modifying tile images in a manner that overcomes the problems described above.

SUMMARY OF THE INVENTION

The illustrative embodiments described herein provide a computer implemented method, apparatus, and computer program product for generating tile sizes associated with an image presented by a web based image system. A threshold memory size for tiles associated with the image is identified. The image is then divided into tiles of equal physical dimensions and placed into a set of subdivided tiles. The memory size of each tile within the set of subdivided tiles is compared to the threshold memory size. Tiles having a memory size less than or equal to the threshold memory size are deleted from the set of subdivided tiles and stored. Tiles having a memory size greater than the threshold memory size are subdivided into tiles of smaller physical dimensions. The smaller tiles are placed back in the set of subdivided tiles. The process repeats until no tiles exist within the set of subdivided tiles.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
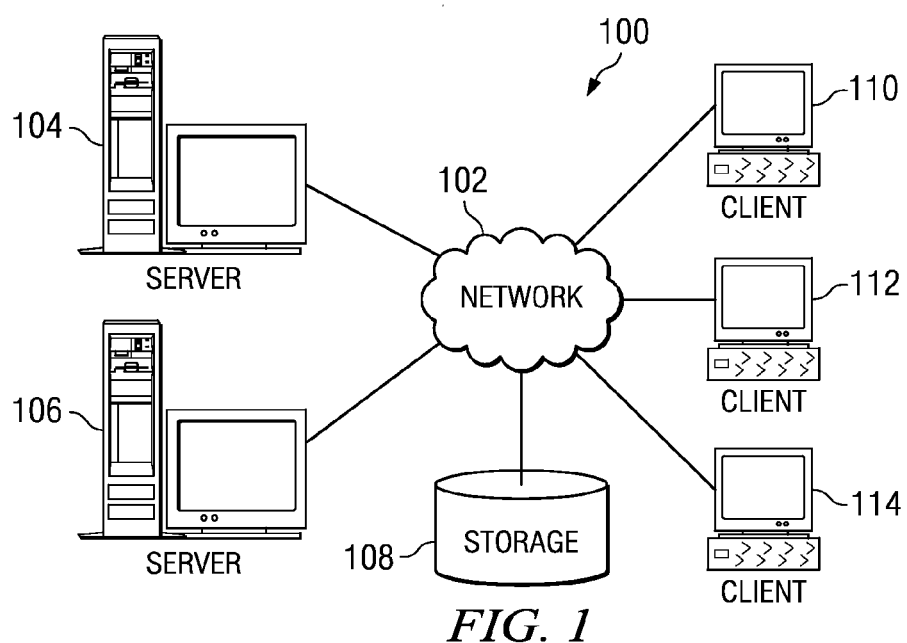
FIG. 1 is a pictorial representation of a network of data processing systems in which illustrative embodiments may be implemented.
Figure 2:
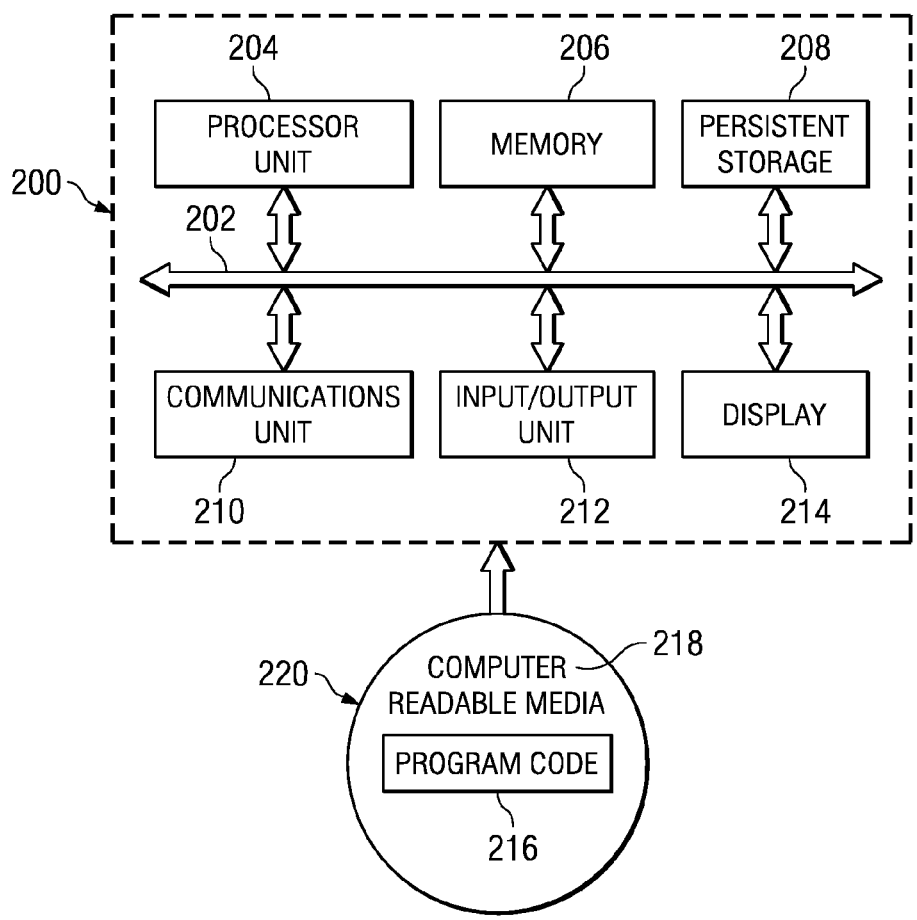
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. The illustrative embodiments may be implemented in a data processing system, such as server 104. Clients 110, 112, and 114 may use an Internet browser to communicate with server 104. For example, server 104 may generate and store tiles of varying physical dimensions. The tiles are associated with an image. In response to receiving a request from a client, such as client 110, over a network, such as network 102, for the image or a part thereof, server 104 sends the associated stored tiles to the client. The sent tiles are assembled by the client and presented to a user using an internet browser. Network data processing system 100 may include additional servers, clients, and other devices not shown.

Network 102 may be, without limitation, a local area network (LAN), wide area network (WAN), Internet, Ethernet, or Intranet. In this example, network 102 is the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein recognize that the current art generates tiles of equal physical dimensions for images associated with a web based image system, such as a web based geographic information (GIS) system. A tile is a section of the overall image. For example, the current art divides an image of the Earth into tiles of equal physical dimensions. Physical dimensions, as used herein, refer to the height and width of the tile. The current art determines the physical dimensions of the tiles based on a predetermined calculation of the optimal update rate for an average tile. Thus, the current art would divide an image of the city of New York into the same number of tiles as it would divide an image of the Atlantic Ocean. The illustrative embodiment recognize that the density of an image should be taken into account to optimize the tiling process because it is not necessary provide the same level of detail in non-dense areas, such as, but not limited to, the Atlantic Ocean, as it would be for more dense areas, such as metropolitan areas.

Thus, the illustrative embodiments described herein provide a computer implemented method, apparatus, and computer program product for generating tile sizes, of varying physical dimensions, associated with an image presented by a web based image system. The web based image system, such as, but not limited to, a web based geographic information systems or a web based computer aided design systems, may be implemented on a data processing system, such as server 104 depicted in FIG. 1. An optimal threshold memory size for tiles associated with the image is identified. The image is then divided into tiles of equal physical dimensions and placed into a set of subdivided tiles. The memory size of each tile within the set of subdivided tiles is compared to the threshold memory size. Tiles having a memory size less than or equal to the threshold memory size are deleted from the set of subdivided tiles and stored. Tiles having a memory size greater than the threshold memory size are subdivided into tiles of smaller physical dimensions. The smaller tiles are placed back in the set of subdivided tiles. The process repeats until no tiles exist within the set of subdivided tiles. The stored tiles are then served up to a data processing system, such as client 110 as depicted in FIG. 1, in response to a request for an image or a part thereof.

Figure 3:
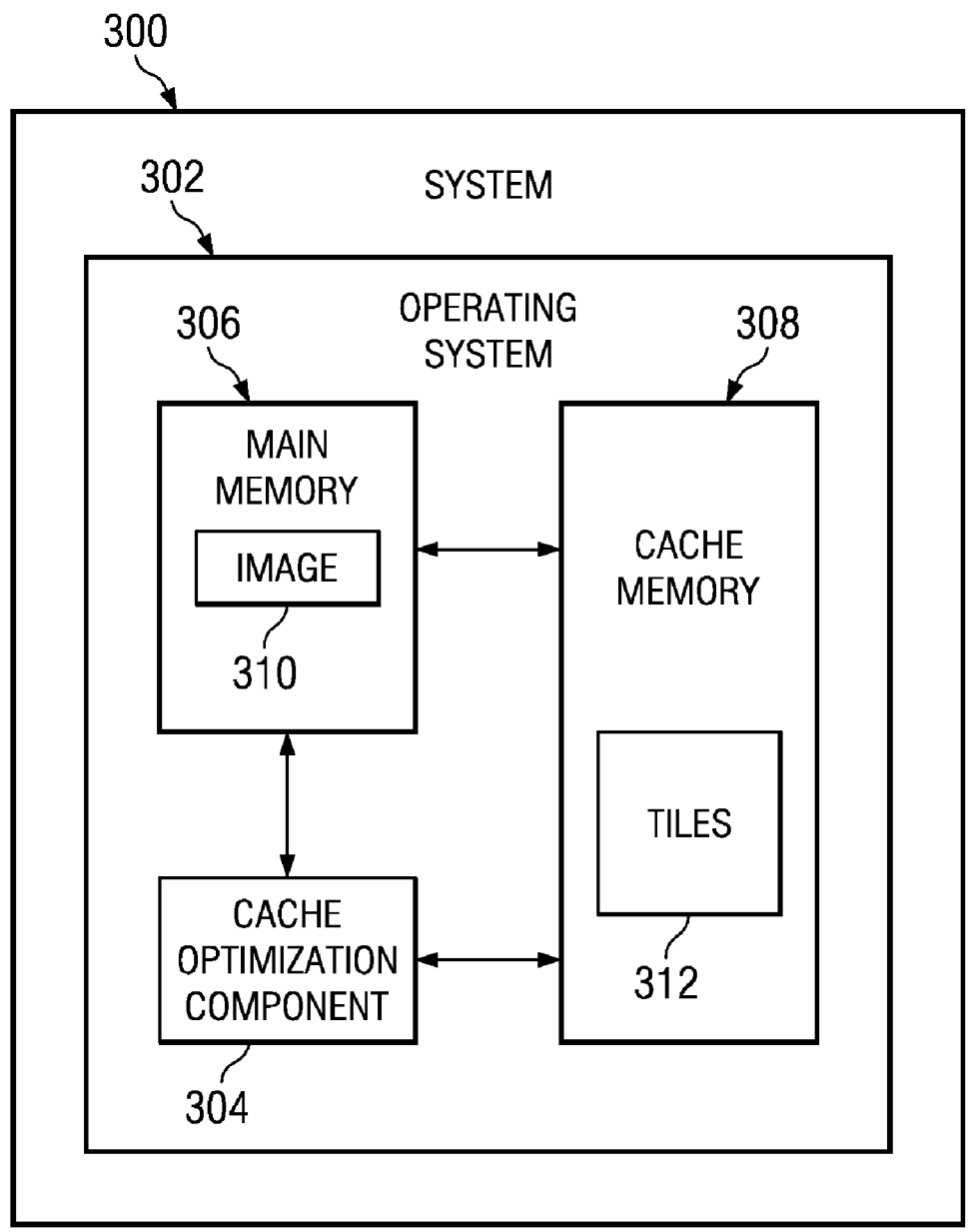
FIG. 3 is a block diagram depicting a data processing environment in which illustrative embodiments may be implemented.

With reference now to FIG. 3, a block diagram is presented depicting a data processing environment in which illustrative embodiments may be implemented. System 300 may be implemented in a data processing system, such as a server 104 shown in FIG. 1, or data processing system 200 shown in FIG. 2. System 300 includes, among other components, operating system 302, a cache optimization component 304, main memory 306, and cache memory 308.

Operating system 302 runs on system 300. Operating system 302 may be, but is not limited to, a commercially available operating system, such as, for example, Microsoft® Windows Server® operating system. Microsoft® Windows Server® is a registered trademark of Microsoft Corporation in the United States and/or in other countries. The illustrative embodiments may be implemented in a cache optimization component 304 running on operating system 302. Additionally, operating system 302 may run other software components or applications.

Main memory 306 may be any type of non-volatile memory, such as, but not limited to, a hard disk drive. A digital image, such as image 310, is stored in main memory 306. Cache optimization component 304 generates tiles, of varying physical dimensions, using image 310. The generated tiles, tiles 312, are stored in cache memory 308. Cache memory 308 may be volatile or non-volatile cache.

The illustrative embodiments generate tile sizes of varying physical dimensions. The size of a selected tile is dependent upon a predetermined threshold memory size. The threshold memory size is calculated based on the optimal update rate for each tile. For example, the threshold memory size may be equal to the average download speed (bytes per second) divided by the average rate of updates (tiles per second) minus the overhead for each tile request.

Figure 4:
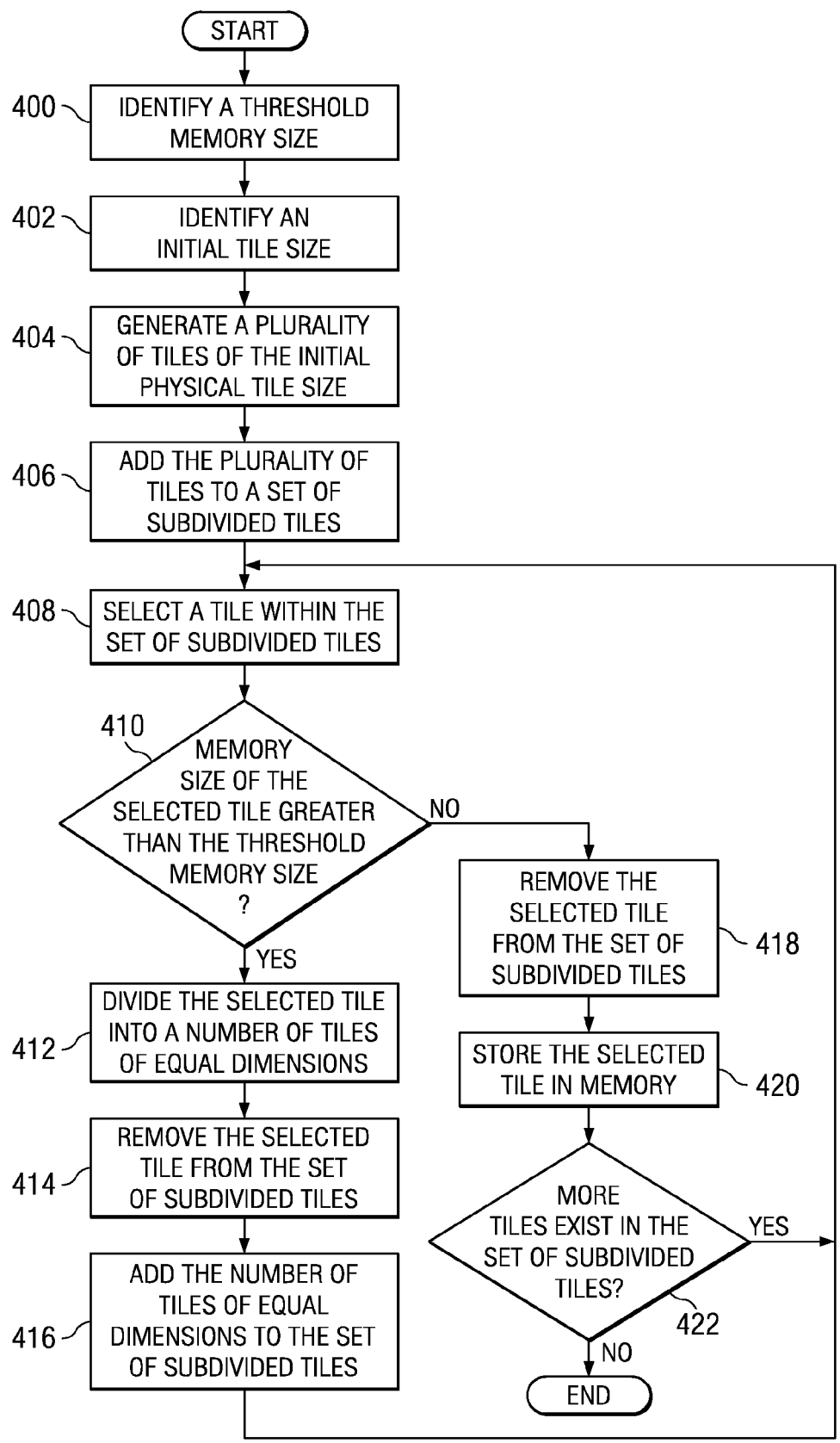
FIG. 4 is a flowchart illustrating a process for generating tiles of varying physical dimensions in accordance with an illustrative embodiment.

With reference now to FIG. 4, a flowchart is presented illustrating a process for generating tile sizes associated with an image presented by a web based image system in accordance with an illustrative embodiment. The process of FIG. 4 may be implemented in a software component, such as cache optimization component 304 depicted FIG. 3.

The process begins by identifying a threshold memory size for each tile associated with an image (step 400). Additionally, the process identifies an initial tile size for the image (step 402). The initial tile size may be determined by, but not limited to, taking the initial physical tile size produced by the current art, where the physical dimensions of the tiles generated by the current art are based on a predetermined calculation of the optimal update rate for an average tile, and multiplying that size by a factor of two to the $n^{th}$ power, wherein n represents the smallest integer value that would result in the initial physical tile size being greater than the length of the image for a current resolution.

The process then generates a plurality of tiles of the initial physical tile size from the image (step 404). The process adds the plurality of tiles to a set of subdivided tiles (step 406). The process selects a tile within the set of subdivided tiles (step 408). The process compares the memory size of the selected tile with the threshold memory size to determine if the memory size of the selected tile is greater than the threshold memory size (step 410). Responsive to a determination that the memory size of the selected tile is greater than the threshold memory size, the process divides the selected tile into a number of tiles of equal dimensions (step 412). The process removes the selected tile from the set of subdivided tiles (step 414). The process adds the number of tiles of equal dimensions to the set of subdivided tiles (step 416). The process returns to the step of selecting a tile within the set of subdivided tiles (step 408).

However, responsive to a determination, at (step 410), that the memory size of the selected tile is less than or equal to the threshold memory size, the process removes the selected tile from the set of subdivided tiles (step 418). The process stores the selected tile in memory (step 420), such as, but not limited to, to cache memory. The process determines if more tiles exist in the set of subdivided tiles (step 420). Responsive to a determination that more tiles exist in the set of subdivided tiles (step 422), the process returns to the step of selecting a tile within the set of subdivided tiles (step 408). However, responsive to a determination that no tiles exist in the set of subdivided tiles, the process terminates.

Figure 5:
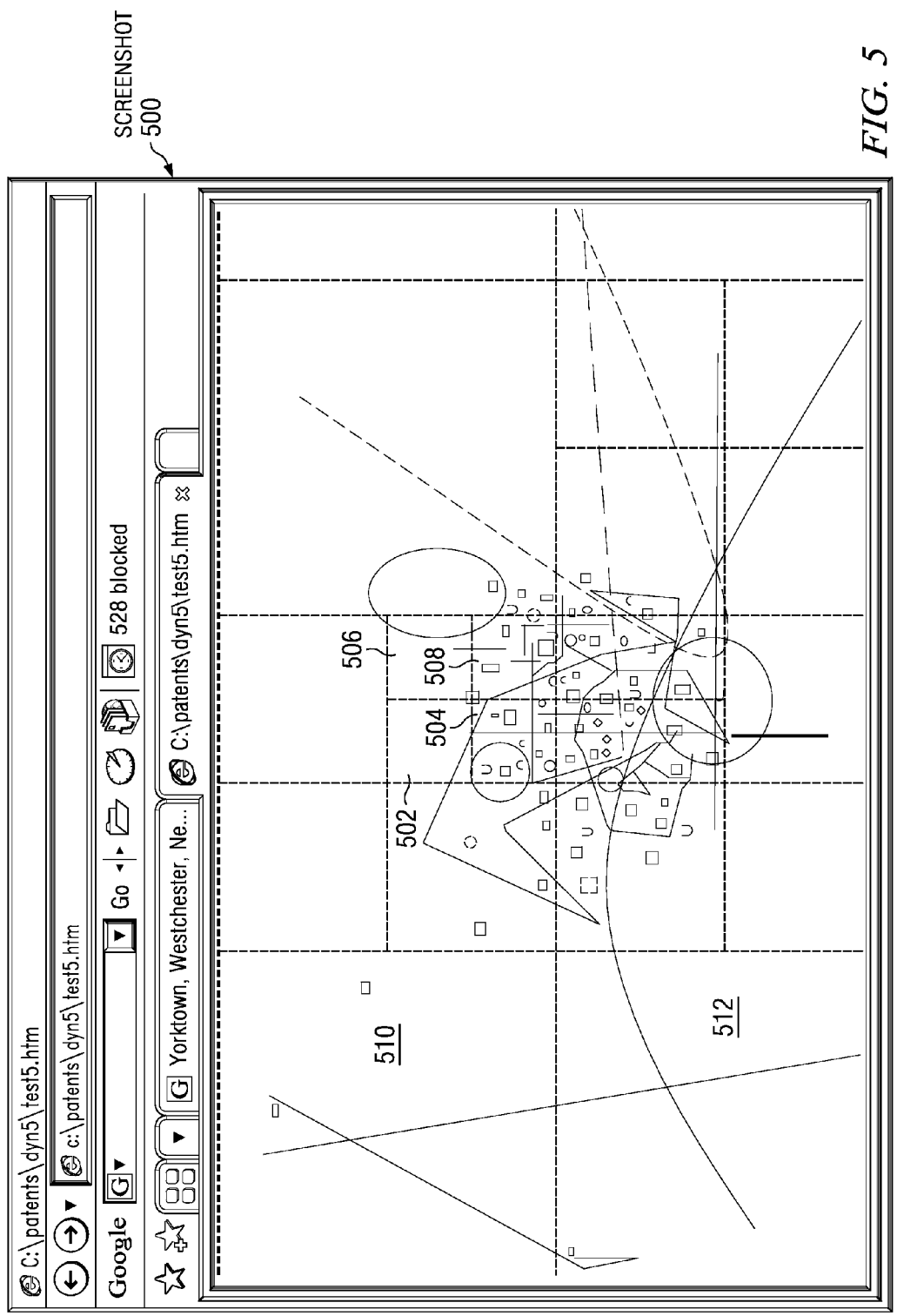
FIG. 5 is a screenshot of generated tiles of varying physical dimensions in accordance with an illustrative embodiment.

With reference now to FIG. 5, a screenshot of generated tiles of varying physical dimensions is depicted in accordance with an illustrative embodiment. Screenshot 500 is depicted in an internet web browser, such as, Internet Explorer™. Other types of internet web browser may also be used. Internet Explorer™ is a registered trademark of Microsoft Corporation in the United States and/or in other countries.

Screenshot 500 depicts tiles of varying physical dimensions. In this illustrative example, the threshold memory size for each tile is four kilobytes (4 kb). Screenshot 500 depicts denser areas of the image have smaller tile dimensions, such as tiles 502, 504, 506, and 508, as compared to lesser dense areas having larger tile dimensions, such as tiles 510 and 512. For example, tiles 502, 504, 506, and 508 may depict a dense area such as Dallas, Tex., whereas, tiles 510, and 512 may depict the Mojave Desert.

Thus, the illustrative embodiments described herein provide a computer implemented method, apparatus, and computer program product for generating tile sizes, of varying physical dimensions, associated with an image presented by a web based image system. An optimal threshold memory size for tiles associated with the image is identified. The image is then divided into tiles of equal physical dimensions and placed into a set of subdivided tiles. The memory size of each tile within the set of subdivided tiles is compared to the threshold memory size. Tiles having a memory size less than or equal to the threshold memory size are deleted from the set of subdivided tiles and stored. Tiles having a memory size greater than the threshold memory size are subdivided into tiles of smaller physical dimensions. The smaller tiles are placed back in the set of subdivided tiles. The process repeats until no tiles exist within the set of subdivided tiles. The stored tiles are then served up to a data processing system, such as client 110 as depicted in FIG. 1, in response to a request for an image.

The illustrative embodiments described herein provide a computer implemented method, apparatus, and computer program product that generates tiles that are closer in memory size, but with varying physical dimension. The smallest tile in terms of physical dimension generated by the illustrative embodiments is equal to the physical dimensions of the tiles generated by the current methods of generating tiles of equal physical dimensions as described above. The illustrative embodiments generate tiles of varying physical dimensions that may be, but is not limited to, tile sizes that are two, four, eight, or sixteen times the size of the smallest tile size in terms of physical dimensions. Accordingly, one advantage presented by the illustrative embodiments is that the number of tiles downloaded is, at most, equal to that of equal sized approach currently being used. However, the illustrative embodiments on average would result in fewer tiles being downloaded than that of the equal sized approach. Therefore, the illustrative embodiments on average would result in fewer requests per area of the screen and hence, less overhead (number of transactions needed to satisfy a request) when compared with the current methods.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating tile sizes of varying physical dimensions, the computer implemented method comprising:

identifying, by a processor unit, a threshold memory size for each tile associated with an image based on a maximum memory size of a tile that can be downloaded at a pre-determined rate, wherein the step of identifying the threshold memory size comprises identifying an average download speed divided by an average number of tiles per second minus an overhead to form the threshold memory size;

identifying an initial physical tile size for the image;

generating a plurality of tiles having the initial physical tile size from the image;

adding the plurality of tiles to a set of subdivided tiles;

determining, for each one of the tiles within the set of subdivided tiles, whether a memory size associated with a selected tile within the set of subdivided tiles is less than or equal to the threshold memory size;

responsive to a determination that the memory size associated with the selected tile is less than or equal to the threshold memory size, storing the selected tile in a set of stored tiles;

responsive to storing the selected tile in the set of stored tiles, deleting the selected tile within the set of subdivided tiles from the set of subdivided tiles;

responsive to a determination that the memory size associated with the selected tile is greater than the threshold memory size, dividing the selected tile into a number of tiles of equal dimensions;

responsive to dividing the selected tile into the number of tiles of equal dimension, adding the number of tiles to the set of subdivided tiles;

responsive to adding the number of tiles to the set of subdivided tiles, deleting the selected tile from the set of subdivided tiles;

repeating the determining, storing, dividing, adding, and deleting steps, for each one of the tiles within the set of subdivided tiles, until all tiles are deleted from the set of subdivided tiles; and responsive to deleting all tiles from the set of subdivided tiles, and responsive to receiving a request for the image, or a part thereof, presenting tiles within the set of stored tiles, wherein the tiles are assembled to generate the image, or a part thereof, and presented to a user.

2. The computer implemented method of claim 1, wherein the set of stored tiles comprises tiles having different physical dimensions.

3. The computer implemented method of claim 2, wherein a first physical dimension associated with a tile having a smallest physical dimension among the tiles stored within the set of stored tiles is equal to a second physical dimension, wherein the second physical dimension is a physical dimension of tiles associated with an image having tiles of equal physical dimension.

4. The computer implemented method of claim 1, wherein the request for the image is processed by a web based geographic information system.

5. The computer implemented method of claim 1, wherein the initial physical tile size is greater than the length of the image for a current resolution.

6. The computer implemented method of claim 1, wherein the number is four.

7. A computer program product comprising:

a non-transitory computer usable medium including computer usable program code for generating tile sizes of varying physical dimensions, said computer program product comprising:

computer usable program code for identifying a threshold memory size for each tile associated with an image based on a maximum memory size of a tile that can be downloaded at a pre-determined rate by identifying an average download speed divided by an average number of tiles per second minus an overhead to form the threshold memory size;

computer usable program code for identifying an initial physical tile size for the image;

computer usable program code for generating a plurality of tiles having the initial physical tile size from the image;

computer usable program code for adding the plurality of tiles to a set of subdivided tiles;

computer usable program code for determining, for each one of the tiles within the set of subdivided tiles, whether a memory size associated with a selected tile within the set of subdivided tiles is less than or equal to the threshold memory size;

computer usable program code for storing the selected tile in a set of stored tiles in response to a determination that the memory size associated with the selected tile is less than or equal to the threshold memory size;

computer usable program code for deleting the selected tile within the set of subdivided tiles from the set of subdivided tiles in response to storing the selected tile in the set of stored tiles;

computer usable program code for dividing the selected tile into a number of tiles of equal dimensions in response to a determination that the memory size associated with the selected tile is greater than the threshold memory size;

computer usable program code for adding the number of tiles to the set of subdivided tiles in response to dividing the selected tile into the number of tiles of equal dimension;

computer usable program code for deleting the selected tile from the set of subdivided tiles in response to adding the number of tiles to the set of subdivided tiles;

computer usable program code for repeating the determining, storing, dividing, adding, and deleting steps, for each one of the tiles within the set of subdivided tiles, until all tiles are deleted from the set of subdivided tiles; and computer usable program code for presenting tiles within the set of stored tiles, wherein the tiles are assembled to generate the image, or a part thereof, and presented to a user in response to deleting all tiles from the set of subdivided tiles, and in response to receiving a request for the image or a part thereof.

8. The computer program product of claim 7, wherein the set of stored tiles comprises of tiles having different physical dimensions.

9. The computer program product of claim 8, wherein a first physical dimension associated with a tile having a smallest physical dimension among the tiles stored within the set of stored tiles is equal to a second physical dimension, wherein the second physical dimension is a physical dimension of tiles associated with an image having tiles of equal physical dimension.

10. The computer program product of claim 7, wherein the request for the image is processed by a web based geographic information system.

11. The computer program product of claim 7, wherein the initial physical tile size is greater than the length of the image for a current resolution.

12. The computer program product of claim 7, wherein the number is four.

13. An apparatus comprising:

a bus system;

a communications system connected to the bus system;

a memory connected to the bus system, wherein the memory includes computer usable program code; and a process unit connected to the bus system, wherein the process unit executes the computer usable program code to identify a threshold memory size for each tile associated with an image based on a maximum memory size of a tile that can be downloaded at a pre-determined rate by identifying an average download speed divided by an average number of tiles per second minus an overhead to form the threshold memory size; identify an initial physical tile size for the image; generate a plurality of tiles having the initial physical tile size from the image; add the plurality of tiles to a set of subdivided tiles; determine, for each one of the tiles within the set of subdivided tiles, whether a memory size associated with a selected tile within the set of subdivided tiles is less than or equal to the threshold memory size; store the selected tile in a set of stored tiles in response to a determination that the memory size associated with the selected tile is less than or equal to the threshold memory size; delete the selected tile within the set of subdivided tiles from the set of subdivided tiles in response to storing the selected tile in the set of stored tiles; divide the selected tile into a number of tiles of equal dimensions in response to a determination that the memory size associated with the selected tile is greater than the threshold memory size; add the number of tiles to the set of subdivided tiles in response to dividing the selected tile into the number of tiles of equal dimension; delete the selected tile from the set of subdivided tiles in response to add the number of tiles to the set of subdivided tiles; repeat the computer usable program code to determine, store, divide, add, and delete steps, for each one of the tiles within the set of subdivided tiles, until all tiles are deleted from the set of subdivided tiles; and present tiles within the set of stored tiles, wherein the tiles are assembled to generate the image, or a part thereof, and wherein the image is presented to a user in response to receiving a request for the image or a part thereof, and in response to deleting all tiles from the set of subdivided tiles.

14. The apparatus of claim 13, wherein the set of stored tiles comprises of tiles having different physical dimensions.

15. The apparatus of claim 14, wherein a first physical dimension associated with a tile having a smallest physical dimension among the tiles stored within the set of stored tiles is equal to a second physical dimension, wherein the second physical dimension is a physical dimension of tiles associated with an image having tiles of equal physical dimension.

16. The apparatus of claim 13, wherein the request for the image is processed by a web based geographic information system.

17. The apparatus of claim 13, wherein the initial physical tile size is greater than the length of the image for a current resolution.

* * * * *